(12) United States Patent
Yip

(10) Patent No.: US 8,573,053 B2
(45) Date of Patent: Nov. 5, 2013

(54) CONTAINER TO RECEIVE LIQUIDS TO AID IN THE VOLUMETRIC MEASURING OF THE LIQUIDS

(76) Inventor: Romuald Yip, Illawong (AU)

( * ) Notice: Subject to any disclaimer, the term of this patent is extended or adjusted under 35 U.S.C. 154(b) by 447 days.

(21) Appl. No.: 12/519,061

(22) PCT Filed: Nov. 21, 2007

(86) PCT No.: PCT/AU2007/001791
§ 371 (c)(1),
(2), (4) Date: Jun. 12, 2009

(87) PCT Pub. No.: WO2008/070897
PCT Pub. Date: Jun. 19, 2008

(65) Prior Publication Data
US 2010/0011855 A1   Jan. 21, 2010

(30) Foreign Application Priority Data
Dec. 15, 2006   (AU) ................................ 2006907008

(51) Int. Cl.
*G01F 19/00*   (2006.01)

(52) U.S. Cl.
USPC .......................................................... 73/426

(58) Field of Classification Search
USPC .............. 73/426, 427; 222/129, 145.1, 145.4, 222/145.5, 154–159, 425.4, 437, 454–457
See application file for complete search history.

(56) References Cited

U.S. PATENT DOCUMENTS

| | | | | |
|---|---|---|---|---|
| 3,648,933 A * | 3/1972 | Grotz | ............................ | 239/377 |
| 3,948,105 A | 4/1976 | Johnson | | |
| 4,292,846 A * | 10/1981 | Barnett | ............................ | 73/427 |
| 4,294,372 A | 10/1981 | Onishi | | |
| 4,298,038 A | 11/1981 | Jennings | | |
| 4,893,729 A | 1/1990 | Iggluden et al. | | |
| 5,447,245 A * | 9/1995 | Merhar | ............................ | 215/6 |
| 2006/0144853 A1 | 7/2006 | Hansen | | |
| 2006/0191824 A1 | 8/2006 | Arett et al. | | |

FOREIGN PATENT DOCUMENTS

| | | |
|---|---|---|
| DE | 29804846 | 6/1998 |
| DE | 102005052803 | 5/2007 |
| EP | 0795267 | 9/1999 |
| GB | 2324296 | 10/1998 |

OTHER PUBLICATIONS

Australian Examination Report, Dec. 1, 2010.

* cited by examiner

*Primary Examiner* — Peter Macchiarolo
*Assistant Examiner* — Jamar Ray
(74) *Attorney, Agent, or Firm* — O'Shea Getz P.C.

(57) ABSTRACT

A container (20) to receive liquids to aid in the volumetric measuring and mixing thereof, said container (20) including a hollow body (21); a bottom wall providing a base (22); a first chamber (27) at least partly enclosed by said base (21) and to receive a first liquid; a top (24) via which the first liquid is delivered to said first chamber (27); a second chamber (28), the second chamber (28) being provided to receive a second liquid and being partitioned from the first chamber (27) but communicating therewith to provide for the flow of at least part of said second liquid to said first chamber; graduations (33) associated with said second chamber (28), said graduations (33) extending in a predetermined direction (34), with said second chamber (28) having a cross section transverse of said direction (34); and wherein said first chamber (27) has a cross section generally parallel to said base (22) that is greater than said cross section of said second chamber (27).

17 Claims, 6 Drawing Sheets

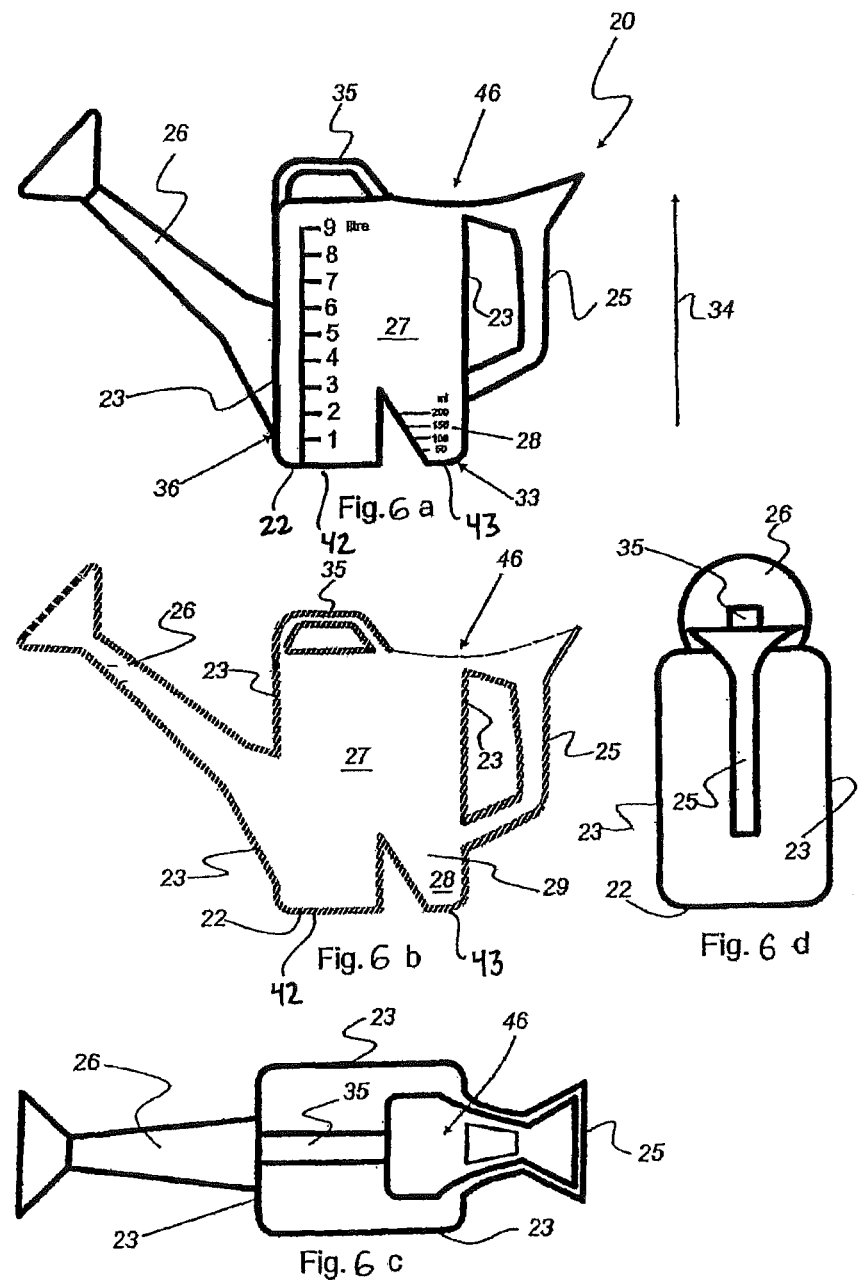

CONTAINER TO RECEIVE LIQUIDS TO AID IN THE VOLUMETRIC MEASURING OF THE LIQUIDS This application is entitled to the benefit of, and incorporates by reference essential subject matter disclosed in PCT Application No. PCT/AU2007/001791 filed on Nov. 21, 2007, which claims priority to Australian Application No. 2006907008 filed Dec. 15, 2006.

TECHNICAL FIELD

The present invention relates to watering cans to aid in the volumetric measuring and mixing of the liquids.

BACKGROUND OF THE INVENTION

The typical design of a water can consists of a container with a handle, a pouring spout extending at an angle from the opposite side of the handle with or without a rose and a water-filling hole at the top. The purpose of a watering can is to allow water to be carried around easily and to be applied to plants and gardens conveniently in a controlled manner through the spout. Modern manufacturing methods allow watering cans to be mostly made of lightweight plastic materials. The most adopted method is blow moulding in which the entire watering can is a one-piece hollow construction. One usual feature of such watering cans is that they are often made of transparent or semi-transparent plastic so that the amount of liquid that it contains is visible through the wall of the watering can. An advantage of the transparent watering can is that volumetric graduation marks can be incorporated on the vertical wall of the watering can so that the volume of liquid it contains can be measured easily by comparing the liquid level revealed through the transparent plastic against the volumetric graduation marks on the watering can. These volumetric graduations are useful as it is often necessary to mix chemical solution to certain proportion volumetrically before applying to garden or plants in order to fertilise, kill weeds or control pests. Many of the additives are in concentrated liquid form and must be diluted with water before application. This requires measuring a relatively small amount of liquid additive, pouring it into the watering can and topping it up with the right amount of water. Typical concentration of the solution required ranges from 1 part of liquid additive to 10 parts of water to 1 part of additive to 100 parts of water. In the case of a typical 9 liter watering can a 1 to 100 mixing ratio would require measuring and adding 90 ml of the liquid additive to a watering can fully filled with water. The volumetric graduations on a reasonably sized watering can, for example, a 9 liter can, are not good enough for measuring this small amount of liquid as the base of this type of watering can is so broad that a small amount of liquid will spread out too thin at the bottom and render the volumetric graduations useless. The conventional way to measure a small amount of liquid volumetrically is to use a small measuring cup or a small measuring cylinder which has a narrow base or narrow body to restrict the small amount of liquid into a column of reasonable height so that the height of the liquid is high enough to be resolved into reasonable graduations to represent the volume of liquid additive with a separate small measuring cup prior to adding it to the watering can in order for subsequent dilution into the required concentration. Filling and handling a small measuring cup is often considered to be troublesome, fiddley and hazardous if the liquid additive has a poisonous nature. Furthermore if a small measuring cup is not available then one would not be able to measure the amount of additive required and therefore unable to make up a solution of the required concentration.

Described in USA Patent Application Publication US 2006/0144853, International Patent Publication WO 2007/088523, UK Patent Application GB 2324296, U.S. Pat. Nos. 4,893,729 and 3,648,933 as well as Netherlands Patent 1005547 and German Patent DE 102005052803 are various containers that receive liquids. These containers do not address the above discussed problems.

OBJECT OF THE INVENTION

It is the object of the present invention to overcome or substantially ameliorate at least one of the above disadvantages.

SUMMARY OF THE INVENTION

There is disclosed herein a watering can to receive liquids to aid in the volumetric measuring and mixing thereof, said watering can including a hollow body to receive the liquids, said body including:
    side walls;
    a base upon which the watering can can rest on a supporting surface, the base including a first bottom wall portion and a second bottom wall portion;
    a first chamber enclosed by the body and extending upwardly from the first bottom wall portion and at least partly enclosed by said first bottom wall portion and to receive a first liquid;
    a second chamber enclosed by the body and extending upwardly from the second bottom wall portion, the second chamber being provided to receive a second liquid and being at least partly enclosed by the second bottom wall portion, and being partitioned from the first chamber but communicating therewith to provide for the flow of at least part of said second liquid to said first chamber to provide for the mixing of the liquids;
    a top having at least one aperture via which the liquids are delivered to the chambers;
    a partition wall extending upwardly from the base and partitioning the first chamber from the second chamber;
    a pouring spout extending outward from one side of the side walls;
    graduations associated with said second chamber to aid a user to volumetrically measure the volume of said second liquid in said second chamber, said graduations extending in a predetermined direction, with said second chamber having a cross section generally normal to said direction;
    said first chamber has a cross section generally parallel to said base that is greater than said cross section of said second chamber; and wherein
    said watering can further includes a handle fixed to and extending from the body so as to be spaced from the spout and to extend from one of the body side walls.

Preferably, said handle includes an aperture for the delivery of said second liquid to said second chamber.

Preferably, said top has an aperture to provide for delivery of said first liquid to said first chamber.

Preferably, said spout projects from said first chamber and said handle projects from said first chamber.

Preferably, the top has an aperture above said second chamber via which at least one of the liquids can be delivered to the chambers.

Preferably, said direction is generally normal to said base.

Preferably, the handle extends from the one body side wall, so as to provide a gripping length gripped by a user, the gripping length being located above the graduations.

BRIEF DESCRIPTION OF THE DRAWINGS

Preferred forms of the present invention will now be described by way of example with reference to the accompanying drawings wherein:

FIG. 1a is a schematic side elevation of a watering can;

FIG. 1b is a schematic sectioned side elevation of the watering can of FIG. 1a;

FIG. 1c is a schematic top plan view of the watering can of FIG. 1a;

FIG. 1d is a schematic end elevation of the watering can of FIG. 1a;

FIG. 2a is a schematic side elevation of a second watering can;

FIG. 2b is a schematic sectioned side elevation of the watering can of FIG. 2a;

FIG. 2c is a schematic top plan view of the watering can of FIG. 2a;

FIG. 2d is a schematic end elevation of the watering can of FIG. 2a;

FIG. 3a is a schematic side elevation of a third watering can;

FIG. 3b is a schematic sectioned side elevation of the watering can of FIG. 3a;

FIG. 3c is a schematic top plan view of the watering can of FIG. 3b;

FIG. 3d is a schematic end elevation of the watering can of FIG. 3a;

FIG. 4a is a schematic side elevation of a fourth watering can;

FIG. 4b is a schematic sectioned side elevation of the watering can of FIG. 4a;

FIG. 4c is a schematic top plan view of the watering can of FIG. 4a;

FIG. 4d is a schematic end elevation of the watering can of FIG. 4a;

FIG. 5a is a schematic side elevation of a fifth watering can;

FIG. 5b is a schematic top plan view of the watering can of FIG. 5a;

FIG. 5c is a schematic sectioned side elevation of the watering can as shown in FIG. 5b sectioned along the line 5-5;

FIG. 5d is a schematic end elevation of the watering can of FIG. 5a;

FIG. 6a is a schematic side elevation of a sixth watering can;

FIG. 6b is a schematic side elevation of the watering can of FIG. 6a;

FIG. 6c is a schematic top plan view of the watering can of FIG. 6a;

FIG. 6d is a schematic end elevation of the watering can of FIG. 6a;

DETAILED DESCRIPTION OF THE PREFERRED EMBODIMENTS

Figure 1:
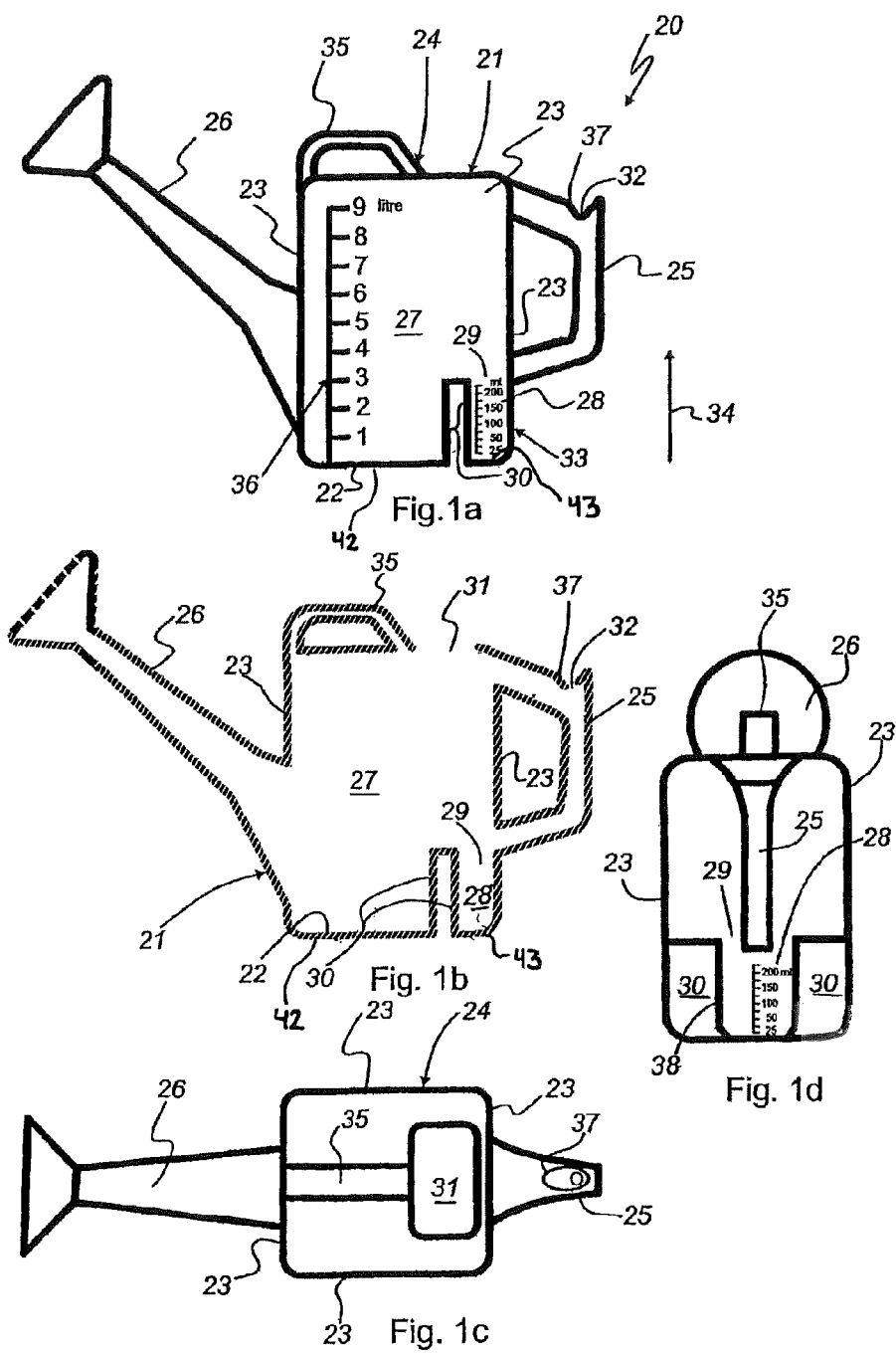

In FIGS. 1a to 1d there is schematically depicted a watering can 20. The watering can 20 has a hollow body 21 with a bottom wall providing a base 22. In use the base 22 can rest on a supporting surface so that the watering can 20 is supported thereby. The base 22 provides a first bottom wall portion 42 and a second bottom wall portion 43.

The body 21 has side walls 23 and a top 24. Extending from one of the side walls 23 is a handle 25 that is also hollow. Also extending from one of the side walls 23 is a spout 26.

The body 21 is hollow so as to provide a first chamber 27 that is to receive a first liquid, and a second chamber 28 that is to receive a second liquid. The chamber 28 is adjacent the base 22. The second chamber has an aperture 29 providing communication between the chambers 27 and 28 to provide for the mixing of the first and second liquids.

Extending between opposite side walls 23 are partition walls 30 that partition the second chamber 28 from the first chamber 27. The walls 30 terminate between the base 22 and top 24.

Preferably, the top 24 is provided with an aperture 31 via which the first liquid can be delivered to the first chamber 27, while the handle 25 has an aperture 32 that provides for the delivery of the second liquid to the interior of the handle 25 from where it flows to be delivered to the second chamber 28.

Operatively associated with the second chamber 28 are graduations 33 that extend in the direction 34. More particularly in this embodiment the direction 34 is generally normal to the base 22.

Preferably the watering can 20 has a second handle 25.

The chamber 28 has a cross section transverse of the direction 34 that is less than the cross section of the chamber 27 that is generally parallel to the base 22.

In use of the above described preferred embodiment, that is the watering can 20, the second liquid is to be much smaller in volume than the first liquid. To provide for the measuring of the second liquid, the second chamber 28 has a smaller cross section as mentioned above. Accordingly, the graduations 33 provide for smaller volumetric measurements.

Preferably there is operatively associated with the second chamber 27 graduations 36 that extend in a direction generally normal to the base 22, that is a direction parallel to the direction 34.

With the watering can 20 resting on a surface, the second liquid is delivered to the chamber 28 via the aperture 31 and handle 25 under the influence of gravity. Similarly the first liquid is delivered to the first chamber 27 under the influence of gravity via the aperture 31.

Preferably the handle 25 has a funnel surface 37 that aids in the delivery of the second liquid to the aperture 32.

The watering can 20 has side wall portions 38 between which the chamber 28 is located. The side wall portions 38 are displaced laterally inward relative to the side walls 23 so as to be closer together and thus aid in providing the chamber 28 with the transverse cross section mentioned above, that is a cross section less than the cross section of the chamber 27.

Figure 2:
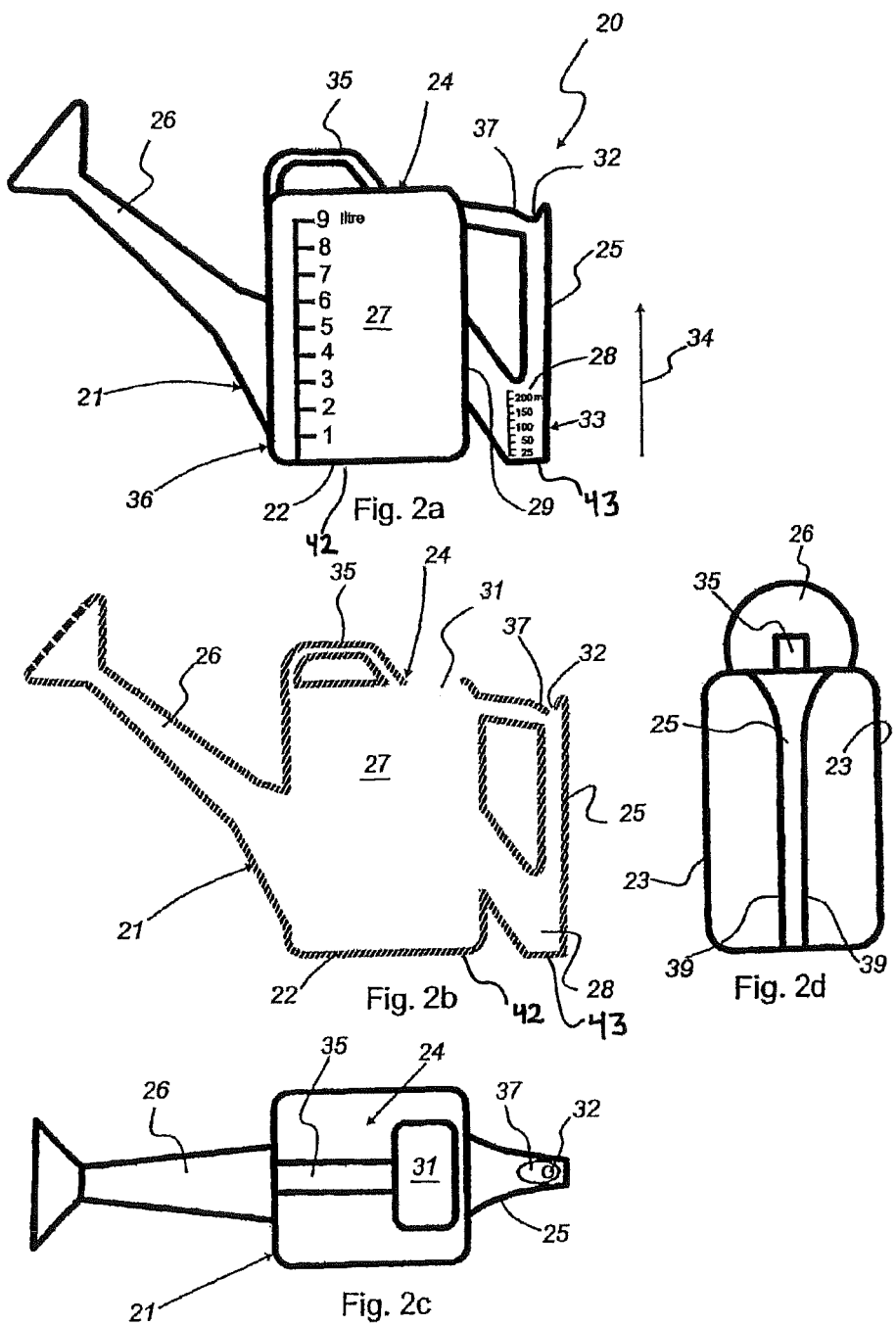

In the embodiment of FIGS. 2a to 2d, the second chamber 28 is provided in the handle 25. The handle 25 has side wall portions 39 that are displaced laterally inwardly relative to the side walls 23. Accordingly the side wall portions 39 are closer together than the side walls 23 to thereby provide the second chamber 28 with a transverse cross section that is less than the cross section of the chamber 27 as discussed above.

Figure 3:
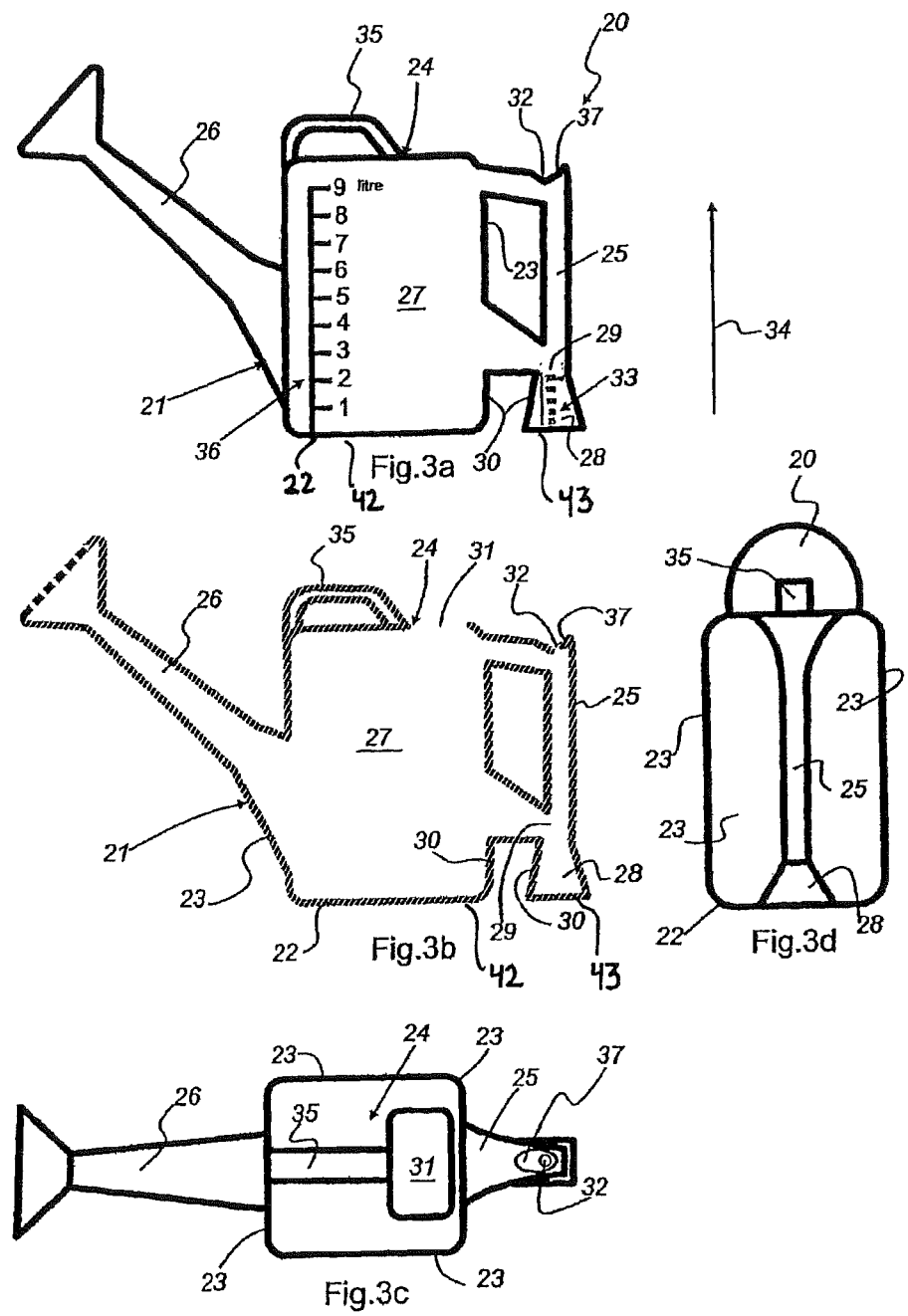

In the embodiment of FIGS. 3a to 3d, the configuration of the handle 25 has been altered relative to the configuration of the handle as shown in FIGS. 2a to 2d.

Figure 4:
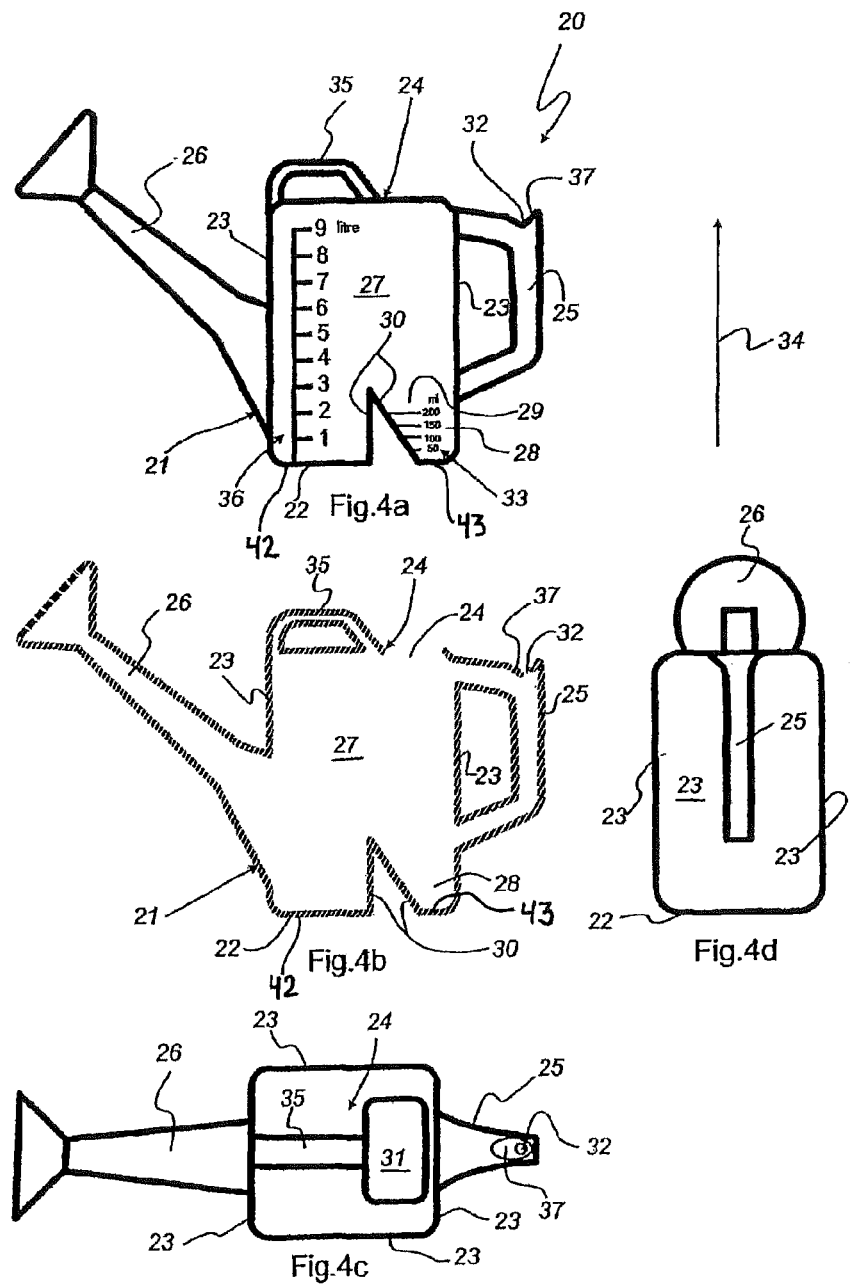

In FIGS. 4a to 4d, the watering can 20 is similar to that described and illustrated with reference to FIGS. 1a to 1d. However in this embodiment, one of the partition walls 30 is inclined to the base 22 by an acute angle.

Figure 5:
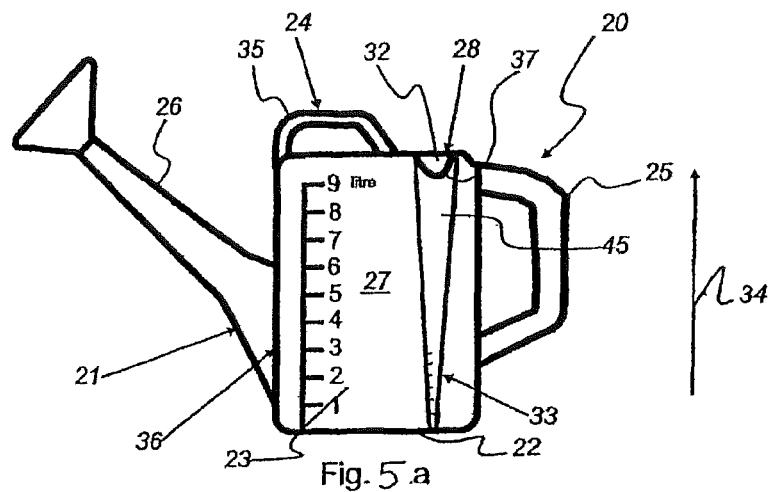
Figure 5:
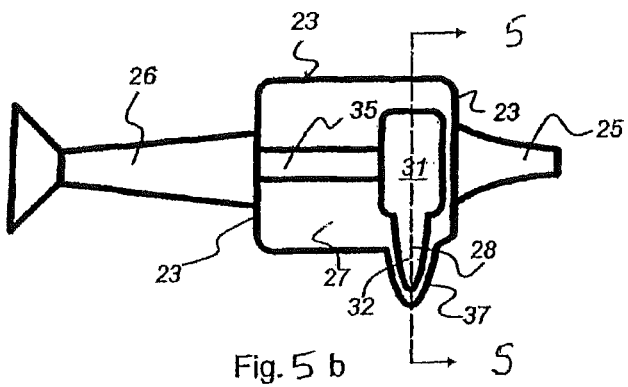
Figure 5:
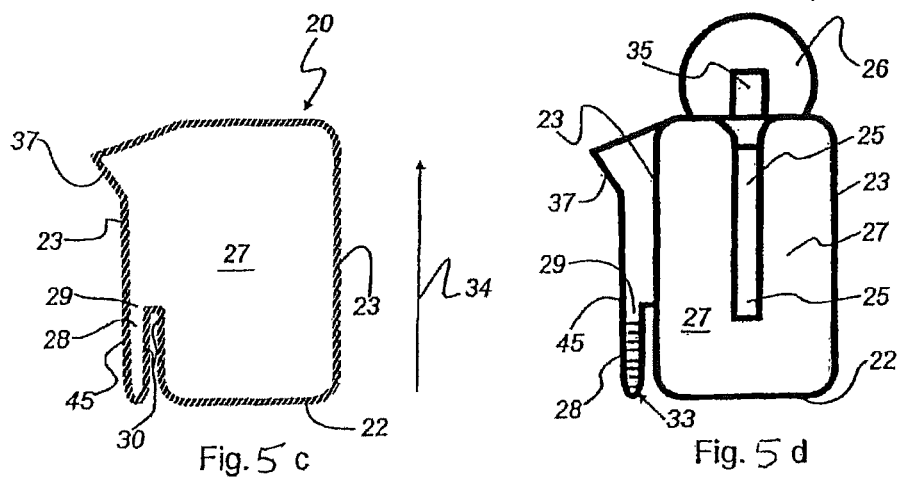

In FIGS. 5a to 5d there is schematically depicted a modification of the watering can 20. In this embodiment, the side wall portion 45 extends from the side wall 23 so as to generally encompass the chamber 28. As in previous embodiments, partition walls 30 partition the chamber 28 from the chamber 27.

In the embodiment of FIGS. 6a to 6d, the watering can 20 is a modification of the watering can of FIGS. 1a to 1d. However in this embodiment, the single aperture 46 provided in the top 24 provides an aperture via which the first liquid may be delivered to the chamber 27, and an aperture via which the second liquid can be delivered to the interior of the handle 25 for delivery to the second chamber 28.

As best seen in FIGS. 1a, 2a, 3a, 4a, 5a and 6a, the handles 25 each extend from a side wall, and provides a length to be gripped, the length being located above the graduations 33.

The invention claimed is:

1. A watering can to receive liquids to aid in the volumetric measuring and mixing thereof, said watering can including a hollow body to receive the liquids, said body including:
    side walls;
    a base upon which the watering can can rest on a supporting surface, the base including a first bottom wall portion and a second bottom wall portion;
    a first chamber enclosed by the body and extending upwardly from the first bottom wall portion and at least partly enclosed by said first bottom wall portion and to receive a first liquid;
    a second chamber enclosed by the body and extending upwardly from the second bottom wall portion, the second chamber being provided to receive a second liquid and being at least partly enclosed by the second bottom wall portion and one of said side walls, and being partitioned from the first chamber but communicating therewith to provide for the flow of at least part of said second liquid to said first chamber to provide for the mixing of the liquids;
    a top having at least one aperture via which the liquids are delivered to the chambers;
    a partition wall extending upwardly from the base and partitioning the first chamber from the second chamber;
    a pouring spout extending outward from one side of the side walls;
    graduations associated with said second chamber to aid a user to volumetrically measure the volume of said second liquid in said second chamber, said graduations extending in a predetermined direction generally normal to said base, with said second chamber having a cross section generally normal to said direction;
    said first chamber has a cross section generally parallel to said base that is greater than said cross section of said second chamber;
    a handle fixed to and extending laterally from the body so as to be spaced from the spout and to extend from said one of said side walls; and wherein
    said handle has an aperture communicating with said second chamber for the delivery of said second liquid through the handle to said second chamber, the handle aperture being spaced laterally from the second chamber.

2. The watering can of claim 1, wherein said top has an aperture to provide for delivery of said first liquid to said first chamber.

3. The watering can of claim 2, wherein said spout projects from said first chamber and said handle projects from said first chamber.

4. The watering can of claim 2, wherein the top has an aperture above said second chamber via which at least one of the liquids can be delivered to the chambers.

5. The watering can of claim 2, wherein said direction is generally normal to said base.

6. The watering can of claim 1, wherein said spout projects from said first chamber and said handle projects from said first chamber.

7. The watering can of claim 6, wherein the top has an aperture above said second chamber via which at least one of the liquids can be delivered to the chambers.

8. The watering can of claim 6, wherein said direction is generally normal to said base.

9. The watering can of claim 1, wherein the top has an aperture above said second chamber via which at least one of the liquids can be delivered to the chambers.

10. The watering can of claim 9, wherein said direction is generally normal to said base.

11. The watering can of claim 1, wherein said direction is generally normal to said base.

12. The watering can of claim 1, wherein said top has an aperture to provide for delivery of said first liquid to said first chamber.

13. The watering can of claim 1, wherein said spout projects from said first chamber and said handle projects from said first chamber.

14. The watering can of claim 1, wherein the top has an aperture above said second chamber via which at least one of the liquids can be delivered to the chambers.

15. The watering can of claim 1, wherein said direction is generally normal to said base.

16. The watering can of claim 1, wherein the handle extends from said one of said side walls to provide a gripping length gripped by a user, the gripping length being located above the graduations.

17. The watering can of claim 1, further including a funnel to direct the second liquid toward the handle aperture.

* * * * *